United States Patent [19]

Massey

[11] Patent Number: 5,009,393
[45] Date of Patent: Apr. 23, 1991

[54] LINEAR FLOW TURN DOWN VALVE

[75] Inventor: Dale A. Massey, Orland Park, Ill.

[73] Assignee: Harper-Wyman Company, Lisle, Ill.

[21] Appl. No.: 537,367

[22] Filed: Jun. 13, 1990

[51] Int. Cl.$^5$ ............................................. F16K 5/10
[52] U.S. Cl. .................................. 251/207; 251/209; 137/625.32; 137/625.3
[58] Field of Search ................ 251/207, 209; 137/905, 137/625.32, 625.3

[56] References Cited

U.S. PATENT DOCUMENTS

| | | | |
|---|---|---|---|
| 762,936 | 6/1904 | Paige | 251/207 X |
| 1,017,789 | 2/1912 | Murphy | 251/209 X |

*Primary Examiner*—Arnold Rosenthal
*Attorney, Agent, or Firm*—Mason, Kolehmainen, Rathburn & Wyss

[57] ABSTRACT

A linear turn down metering valve for gaseous fuels comprises a valve body having a frustoconical valve chamber receiving a rotatable valve plug and including an inlet on one side and an outlet at one end opposite a control shaft at the opposite end. The frustoconical valve plug is rotatable about a central axis aligned coaxially with an outlet end adjacent the chamber outlet. The valve plug includes an annular side wall defining a central bore and normally closes off the valve chamber inlet when the plug is in an "off" position. The valve plug is formed with a maximum flow, inlet port movable into alignment with the chamber inlet when the valve plug is initially rotated out of the off position to a maximum flow position. The plug includes a pair of generally transversely oriented divergent/convergent flow passages spaced from the valve plug inlet port providing decreasing flow area overlapping with the valve chamber inlet as the plug is rotated from the maximum flow position through a range of intermediate, angularly spaced flow control positions providing a linearly decreasing gas flow rates until reaching a minimum flow rate at the end of the range. The valve plug also includes a separate minimum flow passage system in communication with an adjustable flow control sleeve valve for providing an adjustable minimum flow of gaseous fuel when the plug is rotated to a minimum flow position beyond the intermediate linearly decreasing flow control range.

22 Claims, 7 Drawing Sheets

FIG_8A_

$a = b$
$y \cong x$
$y + x = z$

FIG_8B_

$a > b$
$x < y$
$y + x = z$

FIG_8C_

$a < b$
$x > y$
$x + y = z$

LINEAR FLOW TURN DOWN VALVE

BACKGROUND OF THE INVENTION

1. Field of the Invention

The present invention is directed towards and new and improved, linear flow, turn down valve for metering gaseous fuels such as LP gases and natural gas. More particularly, the linear flow turn down valve is especially designed for use with gaseous fuel burners and provides for a maximum flow when the valve is initially turned on and thereafter a substantially linearly decreasing gas flow rate is provided as the valve control shaft is rotated toward a low or minimum flow value which is adjustable for particular applications. The linear flow turn down metering valve, in accordance with the present invention, is also especially adapted for use with both LP gases and natural gases and is designed to provide a substantially or approximately straight line or linear relationship between the gas flow rate and a rotative knob position to afford a user precise and repeatable control of the amount of heat generated at a gaseous fuel burner downstream of the valve.

2. Description of the Prior Art

Commercially viable existing gas valves used for gas ranges and the like generally provide an off/on function along with discrete low, medium and high flow settings. These types of valves generally do not provide for infinitely variable control of gas flow and also many of these valves do not have an adjustable low flow or minimum flow value suitable for simmering and other low heat value applications commonly utilized and needed.

U.S. Pat. No. 2,526,017 discloses a gas valve which when moved from a closed to an open position, opens rapidly and then closes slowly to regulate the flow of fuel. U.S. Pat. No. 2,626,160 discloses a gas valve having a mechanism whereby a selection for relatively large number of flame types of varying size and intensity can be made. U.S. Pat. No. 2,650,610 discloses a gas valve which may be turned from the off position directly to an on position and then turned gradually to decrease the flow through an infinite number of positions to a simmer position. U.S. Pat. No. 2,650,612 discloses a gas valve having a plug with a plurality or series of ports yet still provides infinitely variable flow control rates. U.S. Pat. No. 2,650,613 and 2,650,614 disclose graduated universal valves for gas appliances having a slitted sleeve and an interconnected sleeve, respectively.

U.S. Pat. No. 2,893,426 discloses a universal gas valve that has improved accuracy and adjustability and employs an arcuate radial slot in a conically-shaped valve plug for throttling gas from an input port to an axial outlet port. U.S. Pat. No. 3,001,547 discloses a universal gas valve of a similar type characterized by the metering effect of a tapered port which is opened or closed to the flow position by the longitudinal movement of a sleeve. U.S. Pat. No. 3,273,595 discloses a gas flow control valve providing an improved click-stop, indexed type multiple position burner control and U.S. Pat. No. 3,727,882 discloses a metering valve having a valve plug with an annular groove tapering from zero width to full width and in communication with a port and a rotatable valve seat member.

U.S. Pat. Nos. 4,779,643 and 4,862,917 disclose complex and relatively complicated fuel control devices having a rotatable valve plug and a nonrotatable apertured valve disk biased toward one another for throttling gas flow through the disk to a burner.

The Sourdillon Arindex Co., of B.P. No. 10, Veigne, France 37250 has manufactured a linear flow valve sold as Model No. 831 for use with natural manufacture and mixed gaseous fuels to provide a linear turn down valve characteristic.

OBJECTS OF THE PRESENT INVENTION

It is an object of the present invention to provide a new and improved linear metering valve for gaseous fuels.

More particularly, it is an object to provide a new and improved linear turn down metering valve for gaseous fuels having a control shaft rotatable out of an off position to a maximum flow position and thereafter through a range of angular positions wherein the flow is reduced proportionately with the amount of angular rotation until reaching a minimum flow condition.

Still another object of the present invention is to provide a new and improved linear turn down metering valve of the character described employing a small adjustable flow control valve on a valve plug member positioned to be readily accessible for selectively controlling the gas flow rate through the valve when the valve is positioned in a minimum flow or "simmer" position.

Still another object of the present invention is to provide a new and improved linear turn down metering valve of the character described which is suitable for use with relatively high pressure LP gases as well as low pressure natural gases.

Yet another object of the present invention is to provide a new and improved linear turn down metering valve for gaseous fuels of the character described which provides smooth, infinitely variable control for a range of gas flow rates between a maximum and a minimum value, which minimum value is selectively adjustable to provide for different types of gas and pressures.

Still another object of the present invention is to provide a new and improved linear turn down metering valve for gaseous fuels which is relatively simple and straightforward in construction and operation and which employs a minimal number of components, which components are relatively low in cost and more easily manufactured for providing a long and useful valve life throughout a high number of repetitive operational cycles.

Yet another object of the present invention is to provide a new and improved linear type metering valve for gaseous fuels providing an operator with finely controllable, infinitely variable control settings throughout a desired range of gas flows between a maximum flow and a minimum flow rate.

Still another object of the present invention is to provide a new and improved metering valve for gaseous fuels providing a low flow rate after initially being turned on and thereafter proportionately increasing flow rates as a control shaft is rotated to a maximum flow rate position.

Yet another important object of the present invention is to provide a new and improved flow control valve employing a pair of divergent/convergent generally transversely extending flow passages formed on a valve member for an overlapping relationship with a single flow port to provide decreasing/increasing flow rates generally proportional to the amount of control shaft rotation.

Yet another object of the present invention is to provide a new and improved flow control valve as set forth in the preceding object, employing a frustoconically-shaped element having said divergent/convergent flow passages formed thereon wherein precise flow rates are attainable using only ordinary manufacturing methods and tolerances in the manufacture of the valve.

Another important object of the present invention is to provide a linear valve having compensation means in the manufacture thereof so that normal machining tolerances may be used yet the valve will still maintain essentially linear operating characteristics.

BRIEF SUMMARY OF THE INVENTION

The foregoing and other objects and advantages of the present invention are accomplished in a new and improved linear type turn down, metering valve for gaseous fuels comprising a valve body having a valve chamber receiving a rotatable valve plug. The body includes a radial inlet on one side and an outlet at one end opposite a front end supporting a rotatable shaft. The shaft carries a knob for use in adjusting the rotative position of the valve plug within the chamber. The valve plug is rotatable about a shaft axis centrally aligned with the outlet end of the chamber and includes a longitudinal bore having an outlet adjacent the chamber outlet. The plug is formed with an opening at an opposite end adapted to hold a small, adjustable, metering valve for controlling the flow rate of the valve when the valve plug is in minimum flow or simmer position. The small metering valve is supported on the valve plug and is readily adjustable from exteriorly thereof for selectively controlling a minimum gas flow rate used for simmering and low heat settings.

The valve plug includes an annular side wall defining a central bore and is positioned in the valve chamber to normally close the chamber inlet when the valve plug is in an off position. Immediate rotation of the valve plug in one direction from the off position moves a maximum flow inlet port on the plug into alignment with a fixed chamber inlet providing for a maximum flow rate. Thereafter continued angular rotation of the valve plug through an intermediate range of angular positions provides a steadily decreasing flow rate (turn down) until a minimum flow rate is reached at the end of the range. The minimum flow rate is selectively controllable by means of the small metering valve mounted on the valve plug which is adjustable with a screw driver when the control knob is removed from the control shaft.

Flow rate control in the intermediate range is achieved by the use of a pair of divergent/convergent, generally transversely oriented, spaced apart flow passages, formed on the side wall of the valve plug to directly communicate between the fixed inlet port on the valve chamber wall and the central bore of the valve plug. The pair of spaced apart flow passages can be formed on the valve plug by plunge cuts in an automatic screw machine process utilizing only ordinary manufacturing tolerances, yet the valve will always provide precision flow control even though the precise seating position of the plug in the valve chamber in an axial direction may vary somewhat due to various causes. If the relative path of the inlet port is not precisely centered between the divergent/convergent flow passages, the effective area of overlap may increase with respect to one passage but this difference would be offset by a decrease with respect to the other passage and the total area of overlap between the inlet port and both passages would remain constant regardless of whether or not the axial position of the plug in the valve chamber is always the same. The linear turn down valve provides infinitely variable gas flow rates from a maximum value immediately after the valve is turned on to a minimum value at the end of the linear flow range and thus provides a user with means for precisely and repeatably regulating the amount of heat supplied to a gas burner downstream of the valve.

An alternate embodiment of the invention will provide for a minimum flow position immediately after the plug is rotated out of the off position and thereafter continued rotation of the plug through an intermediate range of angular positions results in a linearly increasing flow rate until a maximum flow rate is reached.

BRIEF DESCRIPTION OF THE DRAWINGS

For a better understanding of the present invention, reference should be had to the following detailed description taken in conjunction with the drawings, in which.

BRIEF DESCRIPTION OF A PREFERRED EMBODIMENT OF THE PRESENT INVENTION

Referring now particularly to the drawings, therein is illustrated a new and improved linear turn down metering valve adapted for use with gaseous fuels and constructed in accordance with the features of the present invention. The turn down valve is indicated generally by the reference numeral 20 and is especially adapted and designed for use in supplying and controlling gas flow to gas burners and the like commonly used in range tops, etc. The valve 20 is adapted for use with relatively high pressure LP gases as well as relatively low pressure natural gas.

Figure 1:
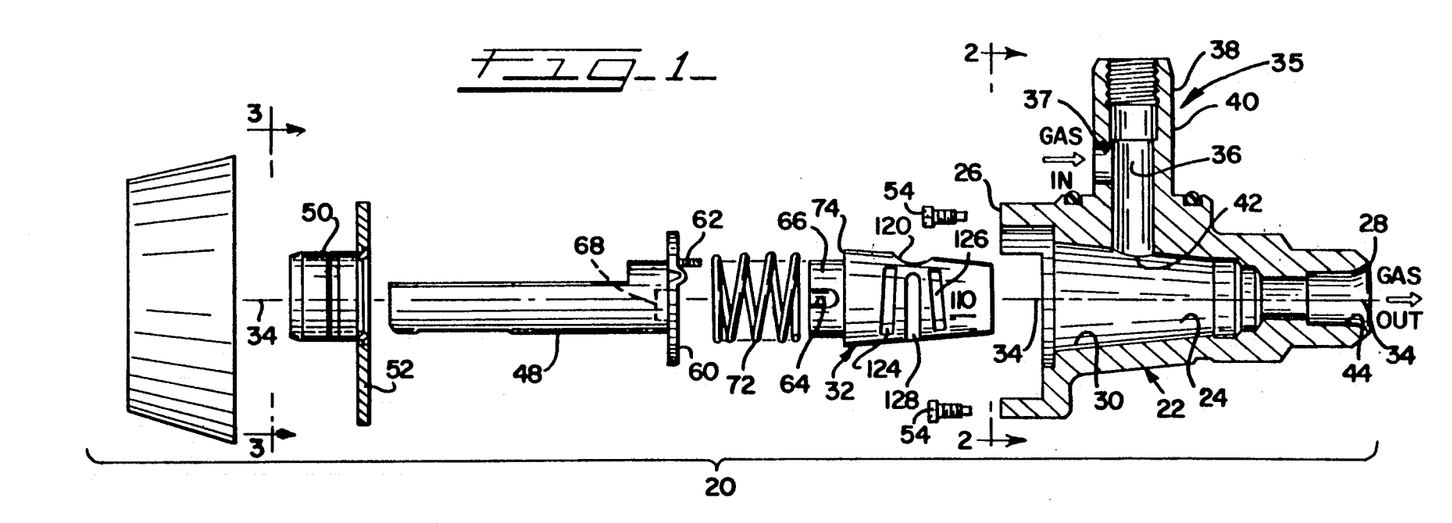
FIG. 1 is an exploded, elevational and cross-sectional view of a new and improved linear turn down metering valve for gaseous fuels constructed in accordance with the features of the present invention.
Figure 2:
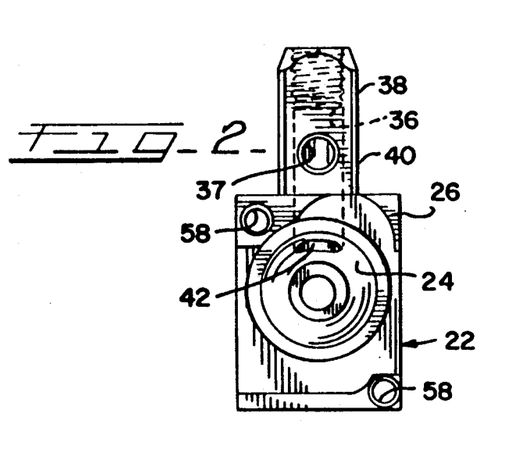
FIG. 2 is a transverse cross-sectional view taken substantially along lines 2—2 of FIG. 1.

The turn down valve 20 includes a metal valve body 22 having a generally rectangular-shaped, transverse cross-section as shown in FIGS. 4, 5, 6 and 7 and is formed with an elongated central bore 24 open at a front or forward end 26 and at the rearward end 28 adapted to h=connected with a supply line for directing gas flow from the valve 20 to one or more burners downstream thereof. The central bore 24 is provided with a frustoconically-shaped forward end portion providing a valve chamber 30 adapted to receive a frustoconically-shaped valve plug 32 mounted for rotation in the chamber about a longitudinal central axis 34 (FIG. 1), extending between the forward and rearward ends 26 and 28 of the valve body 22.

Natural or LP gas flows into the valve chamber 30 through a radial inlet passage 36 of a stem 35 having a threaded internal bore adjacent an outer end portion 38 adapted to receive a mounting screw (not shown) for securing the valve 20 in place in a gas manifold or the like. The radial inlet stem 35 is integral with the main body portion of the valve body 22. At the inner end, the radial inlet passage 36 is in communication with the frustoconical valve chamber 30 through an inlet port 42 intermediate the opposite ends of the valve body 22. The valve plug 32 is rotatable in the valve chamber 30 around the central axis 34 for providing the desired gas flow control characteristics for controlling gas flow moving from the inlet passage 36 and the port 42 through the valve 20 and out to a burner or the like via the rearward end 28 of the valve body 22 having an outlet port 44 defined thereby in coaxial alignment with the axis of valve plug 34.

Rotation of the valve plug 32 is accomplished by a user turning a removable control knob 46 having calibrations thereon adapted to index with a suitable escutcheon plate or the like (not shown). The knob 46 is mounted on an outer end portion of a hollow shaft 48 supported for rotation in a bearing 50 carried on a front bearing plate 52 of rectangular shape matching that of the valve body 22 and secured to the forward end 26 thereof by a pair of cap screws 54. The removable cap screws 54 pass through openings 56 formed at opposite corners of the bearing plate 52 and are received in threaded apertures 58 provided in the forward end 26 of the valve body 22.

The hollow shaft 48 is journalled for rotation in the annular bearing 50 and includes a circular drive plate 60 at the inner end having an eccentric drive tang 62 adapted to drivingly engage the valve plug 32 when the tang is seated in a recess 64 provided in a reduced diameter, forward, cylindrical hub projection 66 integrally formed on the forward end portion of the frustoconical valve plug 32. The circular drive disc 60 also includes a forwardly extending eccentric stop tang 68 adapted to seat in an eccentric slot 70 provided in the front bearing plate 52 for securing the drive disc 60 and valve plug 32 against rotational movement when the valve is moved to an off position after hand pressure released from the control knob 46. A coil spring 72 is seated around the forward cylindrical projection 66 of the valve plug 32 and bears against an annular shoulder 74 to bias the valve plug 32 firmly into the frustoconical valve chamber 30 when the front bearing plate 52 is secured in place. The spring 72 also biases the circular drive disc 60 in a forward direction to seat the tang 68 in the "off" position in the slot 70 in the front plate 52 whenever the rotational position of the drive disc 60 and front bearing plate 52 are aligned in the "off" position.

Figures 9, 10:
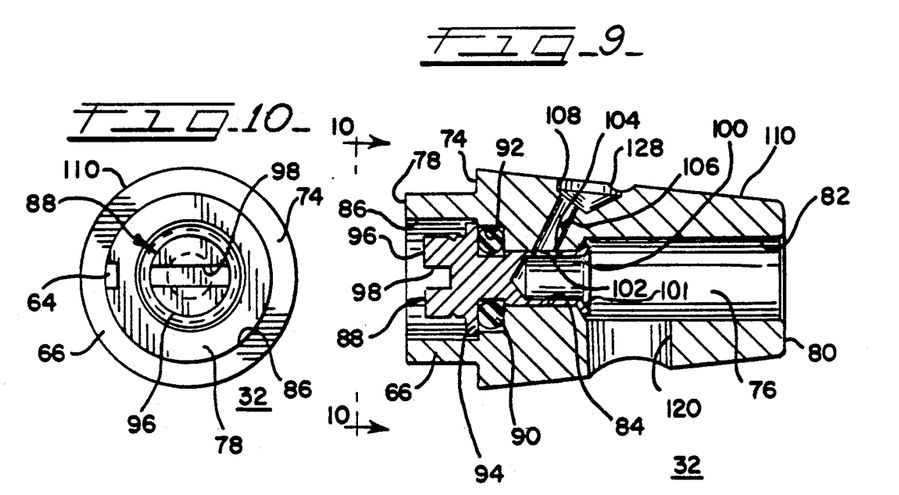
FIG. 9 is a longitudinal cross-sectional view of the valve plug, enlarged to show details of a minimum flow needle valve carried in the plug and taken substantially along lines 9—9 of FIG. 7.
FIG. 10 is an end elevational view of the valve plug taken substantially along lines 10—10 of FIG. 9.
Figure 11:
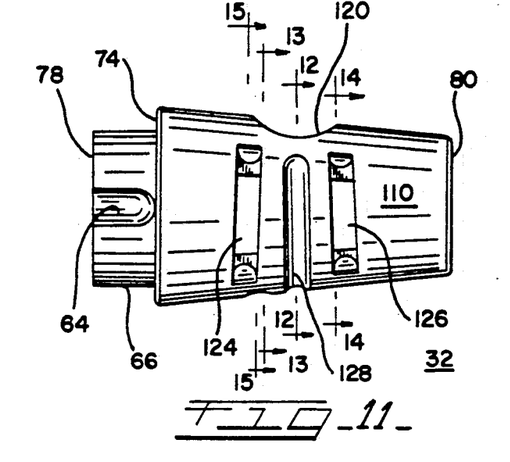
FIG. 11 is an enlarged side elevational view of the valve plug in the same position as illustrated in FIG. 1.
Figure 12:
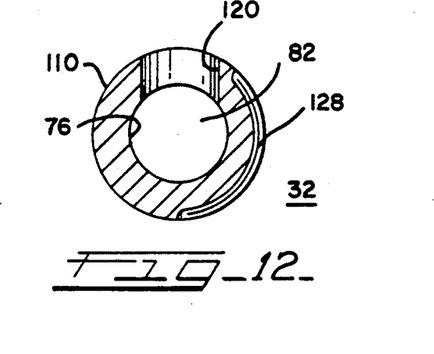
FIG. 12 is a transverse cross-sectional view of the valve plug taken substantially along lines 12—12 of FIG. 11.
Figures 13, 14:
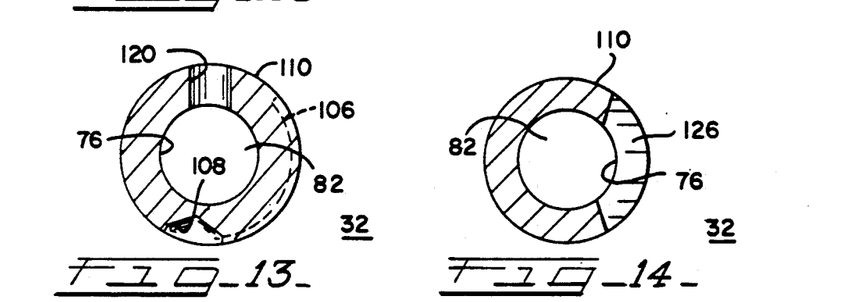
FIG. 13 is a transverse cross-sectional view of the valve plug taken substantially along lines 13—13 of FIG. 11.
FIG. 14 is a transverse cross-sectional view of the valve plug taken substantially along lines 14—14 of FIG. 11.
Figure 15:
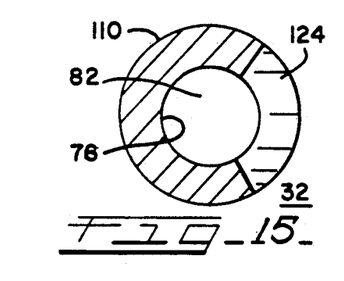
FIG. 15 is a transverse cross-sectional view of the valve plug taken substantially along lines 15—15 of FIG. 11.
Figure 16:
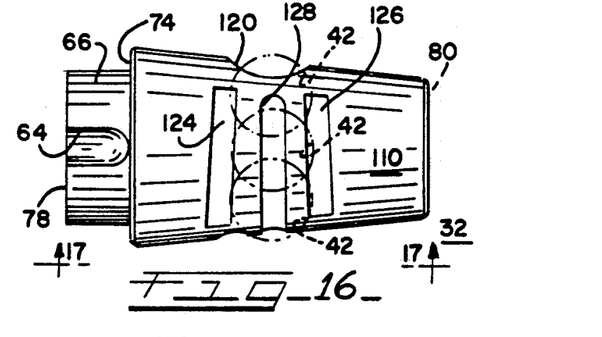
FIG. 16 is a side elevational view of the valve plug, similar to the view of FIG. 11 including in phantom thereon relative positions of an inlet port of a valve chamber as the plug is rotated in the valve chamber through a range of different flow positions.
Figure 17:
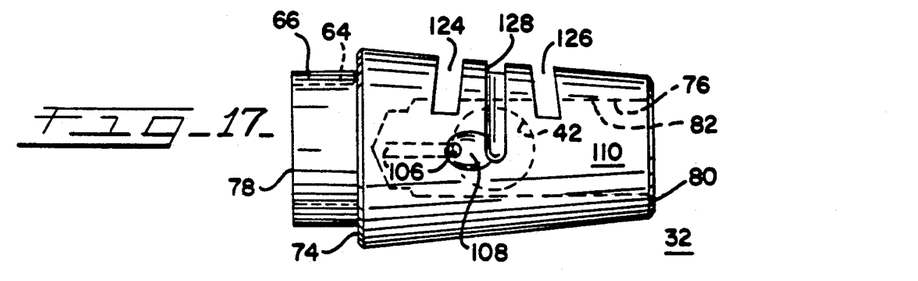
FIG. 17 is a side elevational view of the valve plug taken substantially along lines 17—17 of FIG. 16.

Referring now more particularly to FIGS. 9 and 10, the frustoconically-shaped valve plug 32 also has a hollow axial bore 76 extending between an annular front face 78 and an annular rear face 80 transverse to the longitudinal central axis 34. The elongated axial bore 76 includes a rearward end portion or segment 82, a middle segment 84 of reduced diameter and a forward end segment 86 of enlarged diameter for accommodating the head of an adjustable sleeve valve element 88 and O-ring 90 for sealing between a slightly smaller diameter inner bore segment 92 and the linear face of a washer-like projection 94 of the sleeve valve element 88.

Outwardly of the washer-like portion 94, the sleeve valve includes a generally cylindrical head 96 having a diametrically disposed slot 98 in an outer face thereof for accommodating a screwdriver or other tool used for adjusting the relative rotative position of the sleeve valve member on the valve plug 32. The sleeve valve element 88 includes an inwardly projecting, hollow inner end sleeve 100 dimensioned to seat within the intermediate bore segment 84 and open at an inner end to communicate directly with the rearward end segment 82 of the bore 76 of the valve plug 32. The inner end sleeve 100 is flared out as at 101 to retain the element 88 in place at a selected rotative position and provide a slight amount of axial compression on the O-ring 90 to establish a gas-tight seal within the bore segment 92 during a 360° range of relative rotative adjustments of the sleeve valve element 88 in the valve plug bore 76.

An inner end of the hollow, sleeve valve sleeve portion 100 has a relatively thin wall with a radial port 102 on one side thereof adapted to move into and out of registration with a fixed port 104 on the valve plug 32. The port 104 is positioned at the inner end of a sloped radial passage 106 having an outer end terminating in a shallow, conically-shaped bottom surface of a relatively large, circular recess 108 formed on a frustoconically-shaped, outer surface 110 of the valve plug 32.

Figure 8:
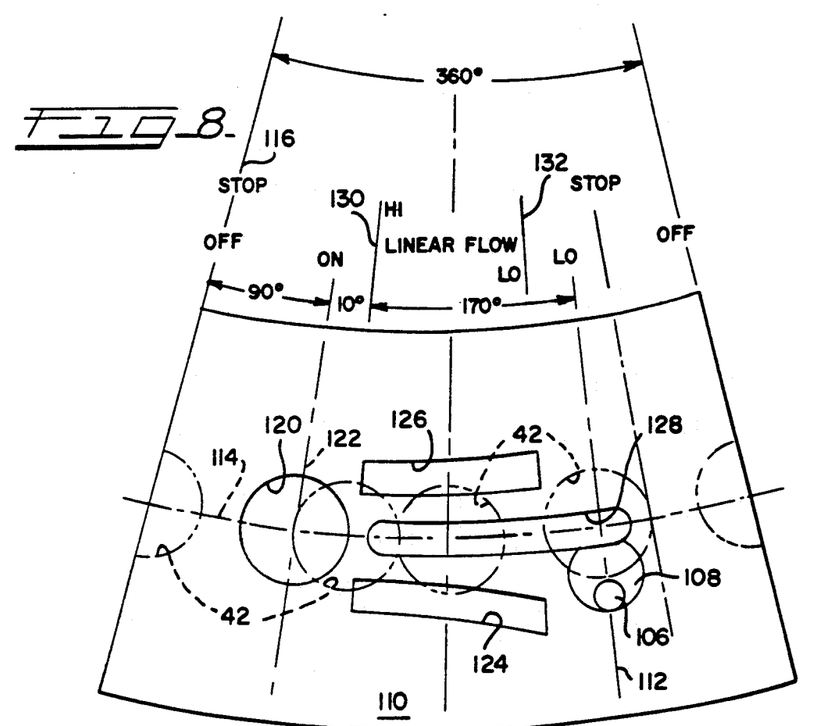
FIG. 8 comprises a planar projection of an outer surface of a valve plug of the invention illustrating passages therein in relation to rotational positions of the plug and an inlet port of the adjacent valve body.

Referring momentarily to FIG. 8, the frustoconical outer surface 110 of the valve plug 32 is projected onto a plane as represented in the drawing and the passage 106 and recess 108 lie on a longitudinal plane represented by a line 112 generally normal or perpendicular to an arcuate path 114 which represents the path of relative movement between the inlet port 42 of the valve chamber 30 and the surface 110 of the valve plug 32 as the plug is rotated from an "off" position represented by a line 116 wherein the tang 68 is seated in the slot 70 of the front bearing plate 52 as previously described.

Figure 4:
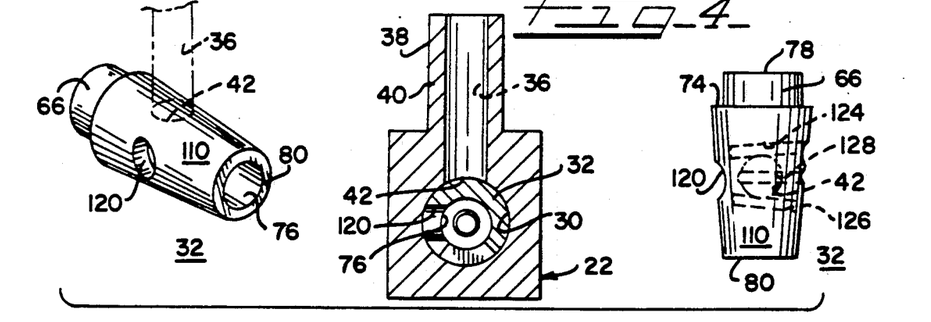
FIG. 4 is a composite view of the valve and component parts thereof including a perspective view of the valve plug, a transverse cross-sectional view through the valve body and an elevational view of a valve plug showing the valve in an off position.

Referring now to FIG. 4, when the frustoconical valve plug 32 is in the "off" or closed position, the inlet port 42 faces against a solid portion of the valve plug surface 110 to shut off all gas flow from the inlet passage 36 into the valve chamber 30 as indicated schematically in FIGS. 4 and 8. When it is desired to open the turn down valve 20 to supply gas to a burner, the control knob 46 is depressed axially inward along the valve axis 34 until the tang 68 is moved out of engagement with the slot 70 in the forward bearing plate 52.

Figure 3:
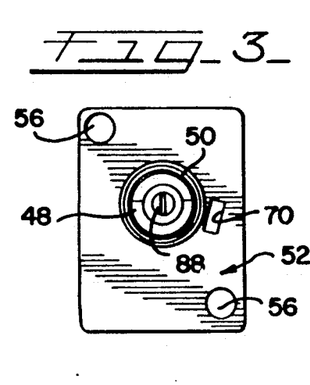
FIG. 3 is a transverse cross-sectional view taken substantially along lines 3—3 of FIG. 1.

Rotation in a counterclockwise direction as shown in FIG. 3, (clockwise direction, FIGS. 4 and 5), of approximately 90 degrees, moves a radial inlet port 120 formed in the frustoconical valve body 32 into alignment with the fixedly positioned inlet port 42 of the gas inlet passage 36. As best illustrated in FIG. 9, the inlet port 120 is in direct communication between the outer body surface 110 of the valve plug 32 and the central rearward end segment 82 of the longitudinal bore 76 so that gaseous fuel may pass directly through the port 120 into the axial bore segment 82 and on out to a gas burner or the like through the outlet end 28 of the valve body 30.

Figure 5:
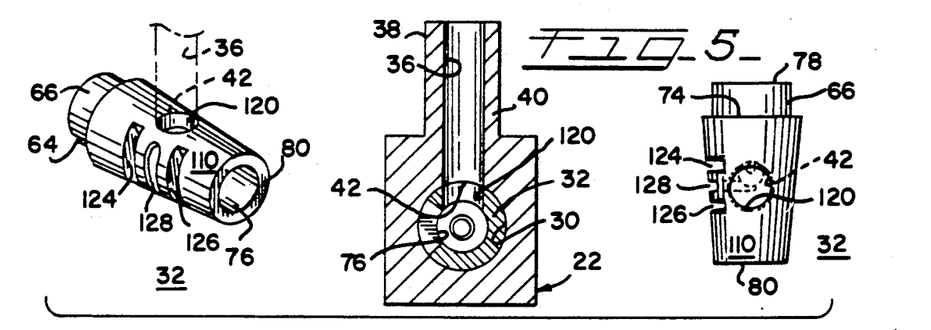
FIG. 5 is a composite assembly of views like FIG. 4, but illustrating the valve in a maximum flow or on position.
Figure 6:
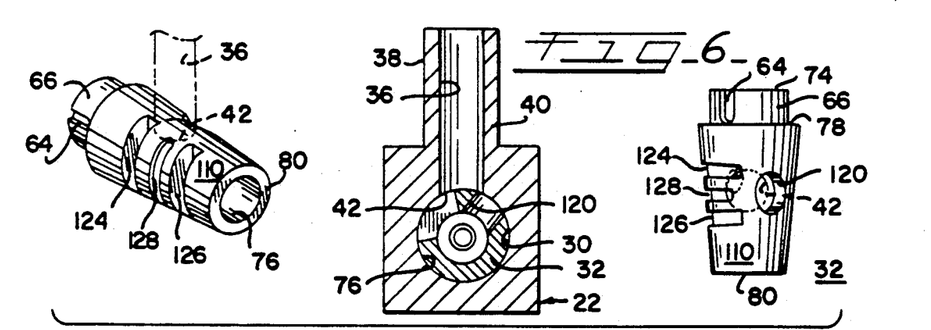
FIG. 6 is a composite assembly of views like FIG. 4, but illustrating the valve in a selected position within a range of linear flow positions for reducing the gas flow in proportion to the amount of shaft rotation away from a maximum flow position of FIG. 5 toward a minimum flow position of FIG. 7.
Figure 7:
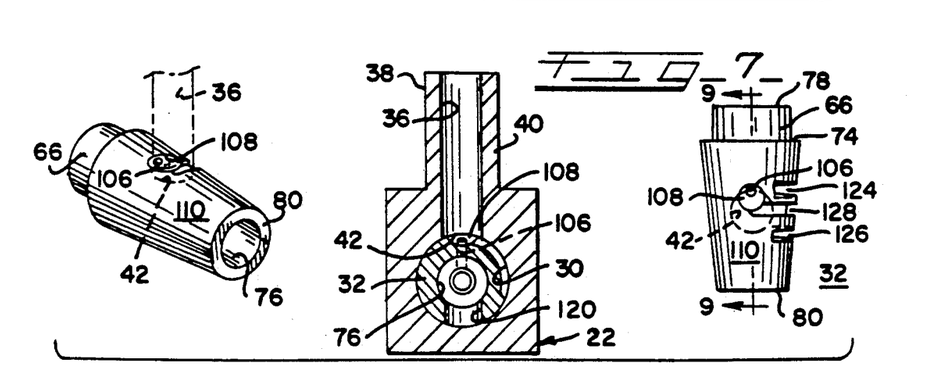
FIG. 7 is a composite assembly of views, similar to FIG. 4, but illustrating the valve in a minimum flow position.

Referring specifically to FIGS. 5, 6 and 8, further rotation of the valve plug 32 from the "on" or "maximum" flow position results in relative movement between the respective ports 42 and 120 until the fixed inlet port 42 of the valve body 30 is only partially aligned with the port 120 on the surface 110 of the valve plug 32 as shown schematically in FIG. 8. As the valve plug 32 is rotated beyond the 90 degree position labeled by the "on" line 122 of FIG. 8, the ports 42 and 120 move out of registration.

In accordance with the present invention, the valve plug 32 is also provided with a pair of arcuate, generally transversely extending, divergent/convergent flow passages 124 and 126 spaced apart on opposite sides of a somewhat longer, but shallower groove 128 having one end terminating in the circular recess 108 having its conically-shaped bottom in communication with the passage 106 and port 104. The flow passages 124 and 126 are preferably formed by machining on an automatic screw machine and the interval or spacing therebetween and angular divergence can be accurately controlled using normal manufacturing methods and conventional machining tolerances.

Referring to FIG. 8, as relative displacement between the fixed inlet port 42 of the valve body 30 and the radial inlet port 120 on the rotating valve plug 32 takes place, the fixed passage 42 comes into communication with the left hand end portions of the respective arcuate slots 124 and 126 and shortly thereafter come into communication with the left hand end portion of the shallow groove 128, even while still overlapping a right hand portion of the large radial inlet port 120 on the valve plug 32. Gas flows into the valve chamber 30 through the inlet passage 36 and diverges to flow both into the inlet port 120, the slots 124 and 126 and the groove 128. Eventually as relative movement proceeds by continued rotation of the valve plug 32, the fixed inlet port 42 is no longer in communication with the inlet port 120 on the valve plug 32 and gas flow then proceeds only through the slots 124 and 126 and the groove 128.

The valve groove 128 is centered on a radial plane normal or perpendicular to the longitudinal axis 34 of the valve plug 32 whereas the arcuate cuts or slots 124 and 126 which communicate directly between the outer plug surface 110 and the rearward central bore segment 82 diverge away from one another and from the travel path 114, toward the right hand end of the slots as viewed in FIG. 8. Because of this gradual divergence, the effective cross-sectional flow area between the port 42 and through the slots 124 and 126 is gradually diminished on a linearly proportional basis as the shaft and plug rotation continues through approximately 170 degrees of rotational travel of the valve plug 32 relative to the valve chamber 30. The gas flow rate goes from a maximum flow or high flow rate position at the starting end of the angular range to a minimum flow rate at the opposite side or end of the range. The respective slots 124 and 126 diverge from the central groove 128 and from one another and this divergence is effective to establish a generally linear relationship between the amount of valve plug rotation and the rate of gas flow from the fixed inlet port 42 to the outlet 28 on the valve body 30.

As the relative position of the fixed inlet port 42 on the valve body 30 moves past the right hand ends of the diverging slots 124 and 126 (FIG. 8), the gas flow through these slots is cut off and thereafter, only a small amount of gas flows through the shallow central groove 128, passages 106 and 108, port 104 and sleeve valve sleeve port 102 to provide for a "low" burner or "simmer" setting. This low flow setting is adjustable for either gas for LP or natural gas by relative rotation of the sleeve valve 88 on the valve plug 32 afforded from the forward end of the control shaft 48 when the control knob 46 is removed. A small screwdriver engaged in the sleeve valve slot 98 is utilized to adjust the relative position between the port 102 on the end sleeve 100 and the relatively fixed inlet port 104 of the valve body 32.

During valve plug rotation through the range of angular positions wherein the port 42 is in continuous communication with the slots 124 and 122, continuous communication is also provided with the shallow groove 128, recess 108, passage 106 and port 104 to permit a relatively small amount of fuel flow into the interior of the sleeve valve sleeve section 100 through the sleeve port 102. The sleeve valve fluid moves from the groove 128 into the passage 106 and port 104 and then through the sleeve port 102 and out into the axial flow through the rear bore segment 82. If adjustment of the minimum flow rate is not required, the sleeve valve 88 is turned until the sleeve port 102 moves out of registration with the port 104.

The amount of slope or degree of gradual angular divergence between the respective linear flow control slots 124 and 126 can be changed and selected as desired to effect other than a precisely linear flow relationship between the amount of effective cross-sectional flow area afforded and the amount of angular rotation provided in the range between high flow and low flow positions as indicated by the respective lines 130 and 132 (FIG. 8).

Figure 8A:
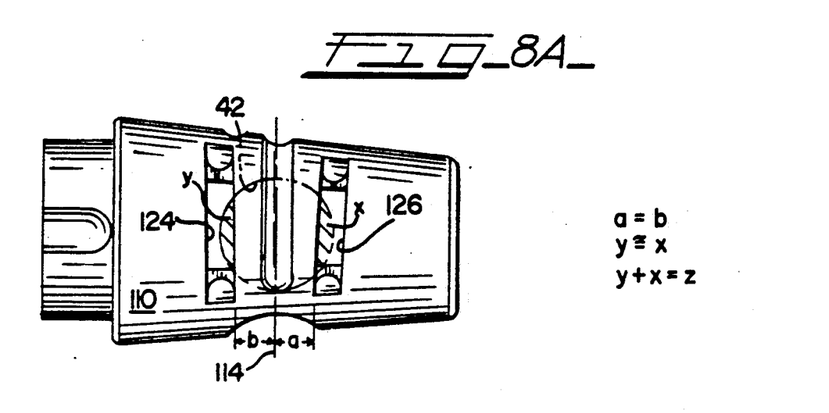
FIG. 8A is a side view representation of a valve plug illustrating a condition wherein a pair of divergent flow passages on a valve plug are equally spaced on opposite sides of a relative path of travel of an inlet port.
Figure 8B:
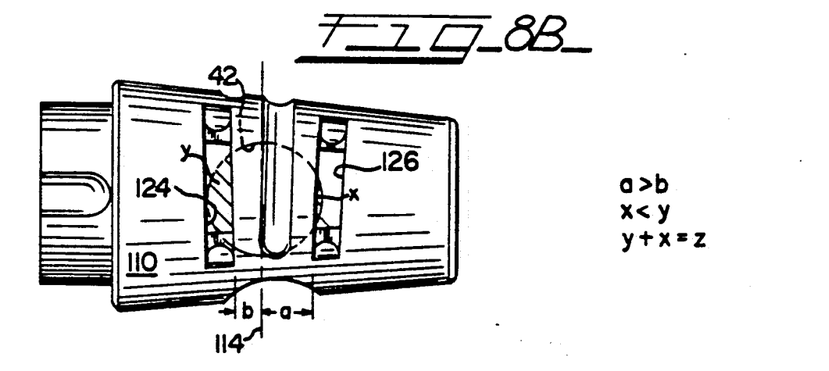
FIG. 8B is a representation similar to FIG. 8A illustrating a condition wherein the relative travel path is closer to a left hand flow passage than it is to a right hand flow passage, yet the total effective overlapping flow area remains essentially constant to provide a linear valve characteristic.
Figure 8C:
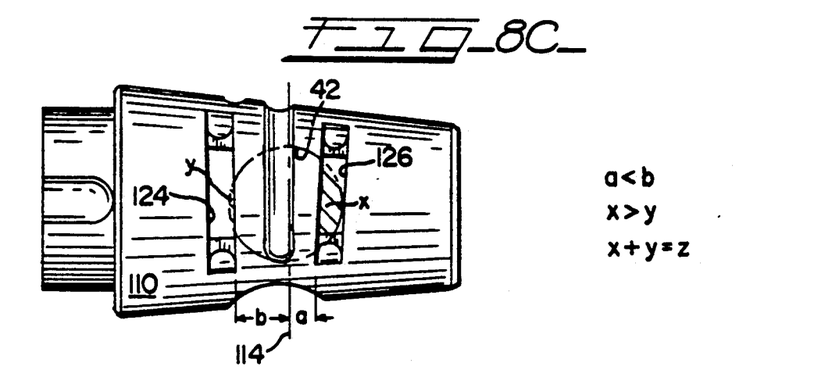
FIG. 8C is a representation similar to FIG. 8A illustrating a condition wherein the relative travel path is closer to the right hand flow passage than it is to the left hand flow passage, yet the total effective overlapping flow area remains essentially constant to provide a linear valve characteristic.

Referring now to FIGS. 8A, 8B and 8C, therein is illustrated the advantageous features of the convergent-/divergent, spaced apart flow passages 124 and 126 which extend generally transversely of the axial bore of the valve plug 32 on opposite sides of the relative travel path 114 of the port 42 with respect to the surface of the valve plug during rotation. Preferably, the spaced apart slots or passages 124 and 126 on the valve plug 32 are formed by plunge cuts on a precision, automatic screw machines operated with ordinary manufacturing tolerances obtaining during the process.

As shown in FIG. 8A, when the relative travel path 114 is evenly centered between the slots 124 and 126 after the plug 32 is seated in the valve chamber 30, the axially measured distances "a" and "b" between the travel path 114 and the respective slots 126 and 124 are equal to one another and accordingly, corresponding areas "x" and "y" of overlapping registration between the port 42 and the respective slots are substantially equal to one another and provide a total effective flow cross-sectional area "z".

FIG. 8B represents a situation where the spacing or axially measured interval "a" between the slot 126 and the relative travel path 114 is greater than the interval or distance "b" between the path 114 and the slot 124. With this condition obtaining, the area of overlapping registration "x" between the port 42 and slot 126 is less than the area of overlapping registration "y" between the port 42 and slot 126, however, the total or sum of the areas "x"+"y" still equals the total area "z" which obtained as shown in FIG. 8A when the distances "a" and "b" were equal.

Relative axial movement of the valve plug 32 when seated in the valve chamber 30 can occur even though machining tolerances on the valve body and valve plug 32 are maintained constant because of the additive or subtractive nature or effect of said tolerances on separate but interfitting parts. However, this makes little or no difference in the operating characteristics of the valve 20 because of the dual slot arrangement wherein a decrease in one area of overlapping registration (for example, area "x") is offset or compensated for by an increase in the opposite area (area "y") of overlapping registration and the sum total difference is substantially zero.

FIG. 8C represents a condition wherein the distance "a" is less than rather than equal to the distance "b" and accordingly, the area "x" is greater than the area "y". Again, however, the sum total "z" of the areas "x" and "y" remains substantially constant or the same value as in the conditions represented by FIGS. 8A and 8B.

The design of a plug 32 having two flow passages 124 and 126 of divergent/convergent alignment spaced so that the inner edges of the slots or passages engage opposite outer portions of the inlet port 42 in the valve body 30 provides consistently accurate flow control in successive valves 20 coming off a production line wherein only normal manufacturing tolerances are required. Should either the valve plug 32 or valve body 30 be machined in a manner such that the inlet port 42 or a transversely extending centerline between the cuts 124 and 126 moves in an axial direction from true centered alignment with respect to one another, the effective total area of overlapping registration between the port 42 and inner edge portions of the respective slots 124 and 126 remains essentially the same so that amount of gas passed through remains nearly constant for any given rotational position of the valve plug 32 despite the changes in precise location of the valve plug 32 in the valve body 30 along the axis 34.

Figure 18:
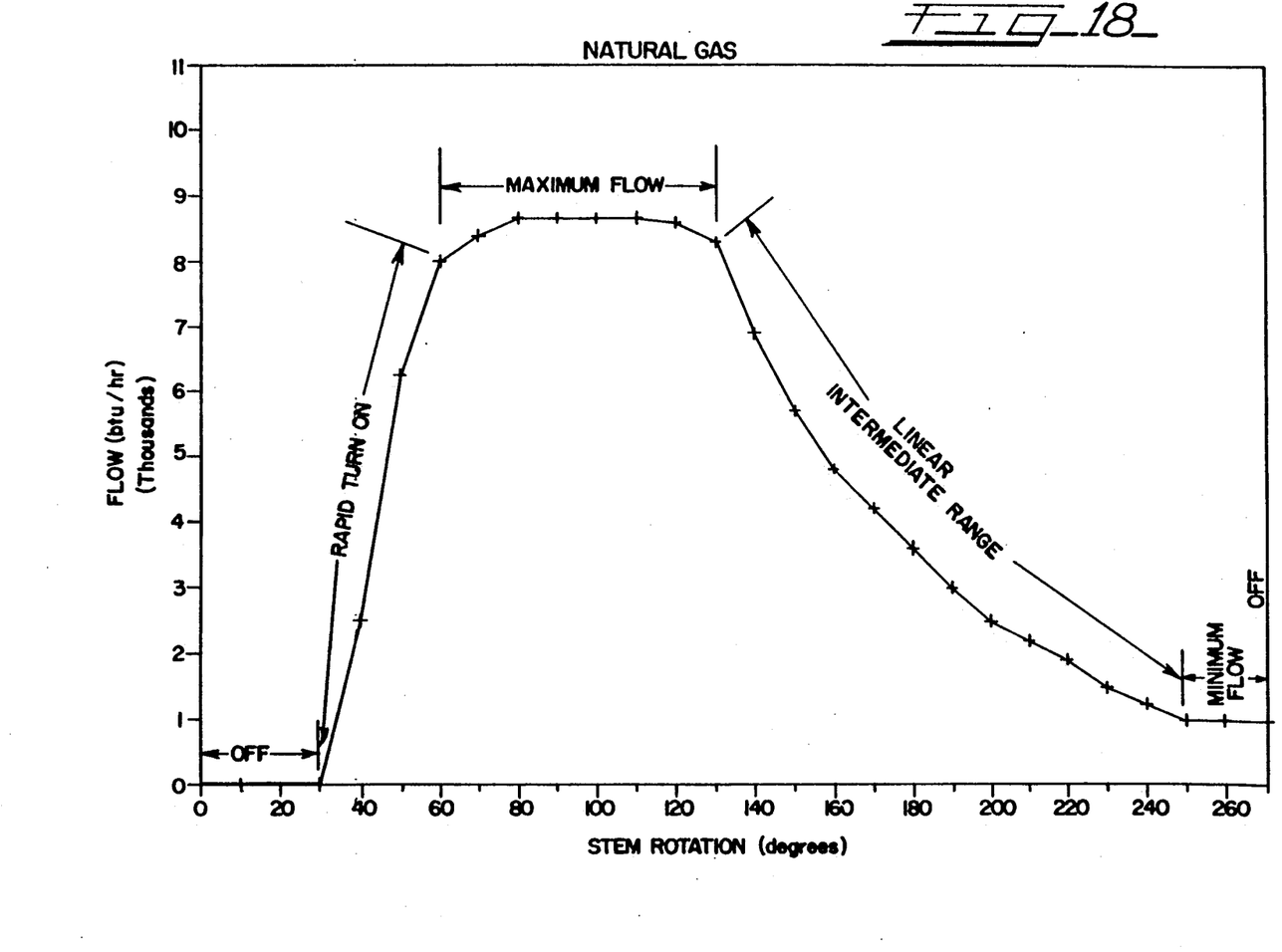
FIG. 18 is a graphical representation of a fuel flow characteristic of the linear turn down valve for natural gas showing the gas flow rate in BTU/hr versus valve stem rotation in degrees.

FIG. 18 of the drawing represents a characteristic curve of a valve 20 in accordance with the present invention in terms of natural gas flow rates (BTU/hr.) versus degrees of rotation of the plug 32 from an off position (0°). Initial rotation of the valve stem provides a rapid turn on to a maximum flow level and thereafter, continued rotation of the valve stem provide a generally linearly decreasing flow rate through an intermediate range until a minimum flow position is reached. The flow level at the minimum flow position is adjustable by relative rotation of the sleeve valve element 88 in the valve plug 32.

Figure 19:
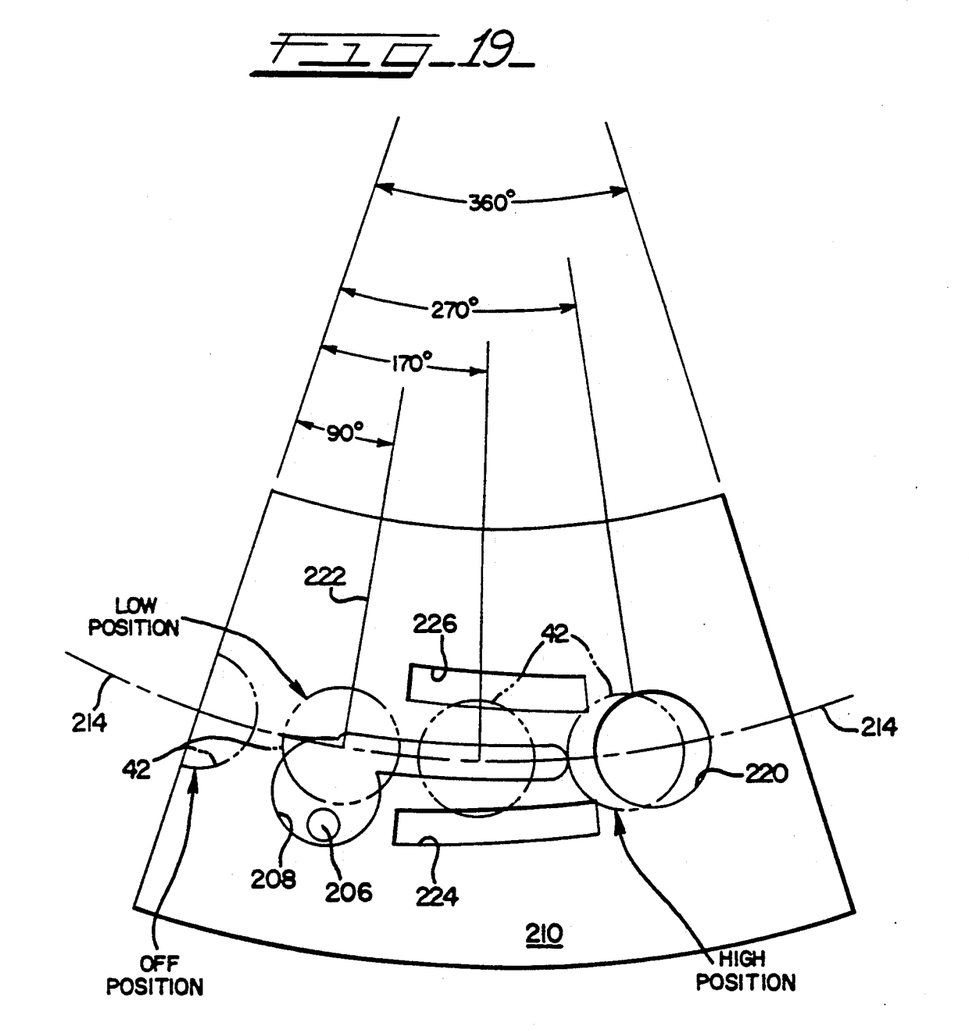
FIG. 19 is a planar view of a valve plug surface similar to FIG. 8 showing an alternate embodiment of a linear valve in accordance with the present invention having a valve characteristic designed to provide a minimum flow rate immediately after the valve is turned on, a linearly increasing intermediate range of flow rates ending in a maximum flow rate.

FIG. 19 illustrates another embodiment of the invention wherein initial rotation of a modified valve plug 232 out of the "off" position (0° position) results in a minimum flow or "simmer" setting as the relative position of the inlet port 42 traveling along the travel path 214 first moves into overlapping registration with a shallow recess 208 therein having a passage 206 connected to the intermediate bore section 84 of the plug 232 and also connected to a shallow groove 228 spaced between a pair of convergent/divergent flow passages 224 and 226. Because the generally transversely extending flow slots 224 and 226 converge toward one another as rotation of the valve plug 32 continues, the areas of overlapping registration between the port 42 and flow slots increases to provide a generally linearly increasing (rather than decreasing) flow rate as plug rotation continues until reaching a maximum flow position wherein the port 42 is in direct registration with a maximum flow port 220 provided in the annular side wall surface 210 of the modified valve plug 232. The valve of FIG. 19, thus provides a linear "turn-up" characteristic from an initial "minimum" flow position immediately after the plug 232 is rotated out of the "off" position and thereafter continued plug rotation provides generally linearly increasing flow rates until a "maximum" flow position is obtained.

The linear turn down valve 20 of the present invention is especially cost effective and employs a minimum number of parts. Moreover, the valve permits ready adjustment of a low value flow rate or simmer setting and generally affords a precisely controllable gas flow with a minimum number of valve components and complex mechanisms being required, especially in comparison to other valve mechanisms such as the fuel control devices of U.S. Pat. Nos. 4,779,643 and 4,862,917. Moreover, because the control ports and passages are mainly in the valve plug 32 rather than the valve body 30 the desired operating characteristics can be more easily achieved at a lower cost because the ports and passages may be formed with a minimum of complex machining operations. The same is true with respect to the flow ports and passages formed in the valve body 30 which are not too complex in nature.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent is:

1. A linear flow control valve for gaseous fuel, comprising:
   a valve body having a chamber for receiving a valve plug and including an inlet on one side and an outlet at one end; and
   a tubular valve plug rotatably mounted in said chamber about a central axis aligned with said outlet, said plug having an outlet at one end adjacent said chamber outlet and an annular side wall defining a central bore extending longitudinally between opposite ends along said axis of rotation, said side wall closing said chamber inlet when said plug is in an off position in said body and having an inlet port movable into alignment with said chamber inlet providing direct communication between said chamber inlet and said bore when said plug is rotated to a maximum flow, on, position in said body;
   said side wall further including a pair of spaced apart divergent/convergent flow slots, extending generally transversely of said axis and penetrating from an outside surface of said plug to said central bore spaced from said inlet port, said divergent/convergent flow slots providing an effective flow cross-section formed by areas of overlap between said chamber inlet and both of said flow slots as said plug is rotated through an intermediate range of angularly spaced, variable flow positions for continuously changing the gas flow rate through said plug.

2. The linear valve of claim.-1, including:
   groove means formed in said plug in parallel with and extending beyond at least one end of said flow slots for providing a relatively low minimum flow rate of gas from said chamber inlet to said central bore when rotation of said plug reaches a minimum flow position adjacent an end of said intermediate range positions.

3. The linear valve of claim 1, wherein:
   said flow slots formed on said valve plug diverge from one another from an end adjacent said maximum flow on position to said opposite end adjacent said minimum flow position.

4. The linear valve of claim 1, wherein
   said inlet port and both of said flow slots are positioned to provide continuing overlap with said inlet of said valve chamber as said plug is rotated through said intermediate range.

5. The linear turn down valve of claim 1, wherein:
   said groove means extends to a far end beyond said flow slots whereby said inlet of said valve chamber does not overlap said flow slots when said plug is rotated to said minimum flow position.

6. The linear turn down valve of claim 1, wherein:
   said plurality of flow slots are spaced apart by a distance in an axial direction for providing simultaneous and continuous overlap between each slot and said inlet of said valve chamber during rotation of said plug through said intermediate range.

7. The linear turn down valve of claim 5, wherein:
   said distance between said flow slots is a minimum at a beginning end of said intermediate range for providing a maximum amount of overlapping area between said inlet of said valve chamber and said flow slots.

8. The linear turn down valve of claim 7, wherein:
   said distance between said flow slots is a maximum at said opposite end of said intermediate range for providing a minimum amount of overlapping area between said inlet of said valve chamber and said flow slots.

9. The linear turn down valve of claim 6, wherein:
   said groove means is spaced between said flow slots to overlap with said inlet of said valve chamber when said inlet is in overlapping relationship with said flow slots.

10. The linear turn down valve of claim 5, wherein:
    said valve plug is formed with a passage extending from said far end of said groove means to a separate metering valve means mounted on said plug for providing a selective adjustable minimum flow rate of fuel when said inlet of said valve chamber is in overlapping relation with said groove means.

11. The linear turn down valve of claim 10, wherein:
    said metering valve means includes a valve member rotatably mounted in said central bore adjacent said opposite end of said plug for adjusting the flow rate of fuel between said passage and said central bore.

12. A linear flow control valve for gaseous fuels, comprising:
    a valve body having a tapered chamber for receiving a valve plug and including an inlet on one side aligned with an inlet port for supplying fuel to said valve plug and an outlet at one end for supply fuel to burner; and
    a hollow tubular valve plug rotatably mounted in and tapered to fit said chamber aligned along a central axis coaxially aligned with said chamber outlet, said plug having an outlet at one end adjacent said chamber outlet and an annular side wall defining a central bore extending longitudinally between opposite ends around said axis of rotation of said valve plug, said plug including an outer surface normally closing said inlet port when said plug is in an off position in said valve body and including a plurality of flow inlets extending generally transversely of said axis and penetrating between said outer surface and said bore, said inlets being movable into overlapping registration with said inlet port of said valve chamber when said plug is rotated out of said off position;
    said plug inlets including at least one pair of axially spaced apart, transverse, divergent/convergent intermediate flow control passages spaced on opposite sides of said inlet port on said valve body to form overlapping registration areas with said inlet port on said body, the size of said overlapping area remaining essentially constant in total when said plug is moved axially in said valve chamber.

13. The linear valve of claim 12, wherein:
a plug inlet includes an elongated, transversely extending groove means formed in said outer surface to communicate with said inlet port for providing a relatively low flow rate of gas into said bore of said plug upon rotation of said plug toward a minimum flow position.

14. The linear valve of claim 12-, wherein:
said pair of said divergent/convergent flow control passages formed on said valve plug and converge toward one another starting at an end adjacent a point where said plug is a minimum flow position toward an opposite end of said passages adjacent a point wherein said plug is in said maximum flow position.

15. The linear valve of claim 12, wherein:
said inlet port of said valve body and said intermediate flow control passages are relatively positioned to overlap as said plug is rotated out of said maximum flow, on, position in one direction with said flow passages diverging as said rotation continues.

16. The turn down valve of claim 13, wherein:
said elongated groove means is spaced apart from and extends generally in the same direction as said intermediate flow passages to a far end while in overlapping relation with said inlet port and out of overlapping relation between said inlet port and said intermediate range flow control passages in said minimum flow position.

17. The linear valve of claim 12, wherein:
said pair of intermediate range flow control passages are spaced apart by an interval extending longitudinally of said outer surface of said plug providing simultaneous overlapping between each of said intermediate range flow passages and said inlet port.

18. The turn down valve of claim 17, wherein:
said interval between said intermediate range flow control passages is at a minimum value when said plug is adjacent said maximum flow position for providing a maximum amount of overlapping area between said inlet port and said intermediate flow control passages at a starting end of said intermediate range.

19. The linear valve of claim 17, wherein:
said interval between said intermediate flow control passages is at a maximum value adjacent a far end of said intermediate flow control passages for providing a minimum of overlapping area between said inlet port and said intermediate flow control passages.

20. The linear valve of claim 13, wherein:
said elongated groove means is spaced between said intermediate flow control passages to overlap with said inlet port when said inlet port is in overlapping relationship with both of said intermediate flow control passages.

21. The linear valve of claim 20, wherein:
said valve plug is formed with a by-pass passage extending between said groove means and an adjustable valve on said plug for providing a minimum flow rate of fuel when said inlet port is in overlapping relation with said groove means.

22. The turn down valve of claim 21, wherein:
said adjustable valve includes a valve member rotatably mounted in said central bore adjacent said opposite end of said plug for adjusting the flow rate of fuel between said elongated groove means and said central bore.

* * * * *